United States Patent [19]

Simmons et al.

[11] Patent Number: 5,345,171
[45] Date of Patent: Sep. 6, 1994

[54] APPARATUS INCLUDING A SELECTIVELY CONNECTABLE ISOLATION TRANSFORMER FOR DETERMINING THE SPEED AND DIRECTION OF A ROTATING OBJECT

[75] Inventors: Jeffrey J. Simmons, Peoria; W. John Love, Dunlap, both of Ill.

[73] Assignee: Caterpillar Inc., Peoria, Ill.

[21] Appl. No.: 2,558

[22] Filed: Jan. 11, 1993

[51] Int. Cl.$^5$ .................. G01P 3/481; G01P 3/489
[52] U.S. Cl. ................................. 324/166; 324/165; 340/672; 364/565
[58] Field of Search ............... 324/160, 163, 165, 166; 364/565; 340/671, 672

[56] References Cited

U.S. PATENT DOCUMENTS

| | | | |
|---|---|---|---|
| 3,728,565 | 4/1973 | O'Callaghan | 324/165 X |
| 4,468,618 | 8/1984 | Zander | 324/165 |
| 4,808,933 | 2/1989 | Kobayashi et al. | 324/166 X |
| 4,839,589 | 6/1989 | Heinle | 324/166 |
| 4,839,834 | 6/1989 | Omae et al. | 324/166 X |

FOREIGN PATENT DOCUMENTS

0042062 3/1980 Japan ............................... 324/165

OTHER PUBLICATIONS

Heilborn, John; Tech Talk All About Pointing Devices Computer Shopper, Dec. 1992, pp. 856–858.

Article: Electronic Design, Sep. 17, 1992, "Build an Error-Free Encoder Interface", James A. Kuzdrall.

*Primary Examiner*—Gerard R. Strecker
*Attorney, Agent, or Firm*—David M. Masterson

[57] ABSTRACT

In one aspect of the present invention, an apparatus determines the rotational speed and direction of a rotating object. The apparatus includes a sensor adapted to detect the speed and direction of the rotating object and responsively produce a frequency signal indicative of the speed of the rotating object and a direction signal having a voltage value indicative of the rotational direction of the rotating object. A distinguishing stage receives the frequency and direction signals, and determines the voltage value of the portion of the direction signal that coincides with the falling edge of the frequency signal. Responsively the distinguishing stage produces a control signal having a voltage level responsive to the determined voltage value of the direction signal. A converting stage receives the frequency signal and responsively produces an output signal having a DC voltage proportional to the frequency of the frequency signal. A directional stage receives the control signal and the output signal, and changes the polarity of the output signal in response to the voltage level of said control signal. An output device receives the polarized output signal, and stores the magnitude and polarity of the output signal.

9 Claims, 7 Drawing Sheets

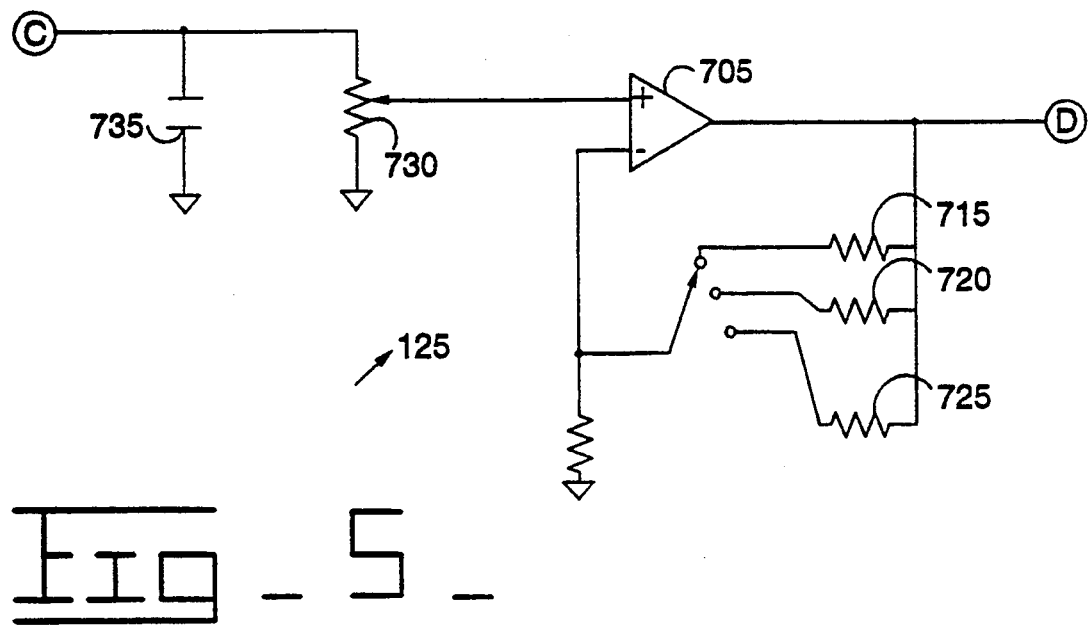
Fig_5_
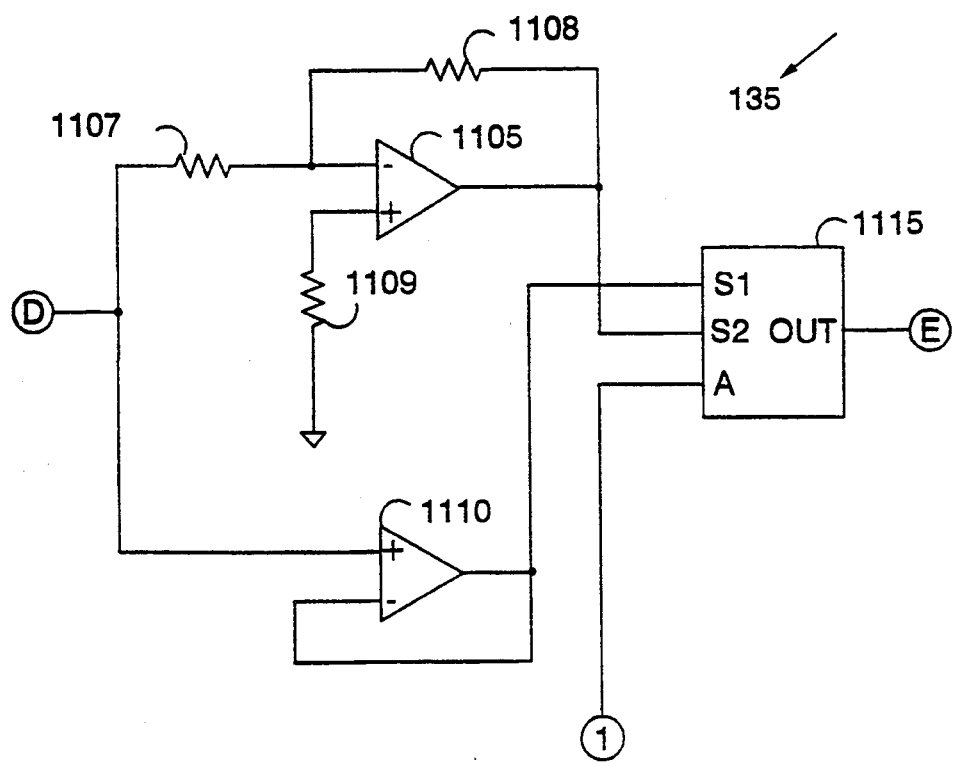
Fig_9_

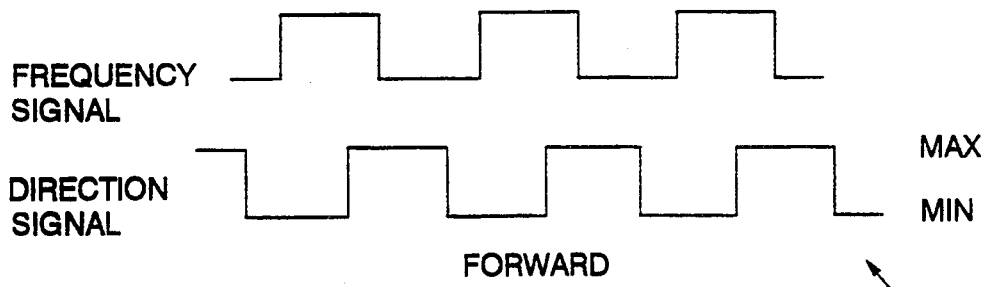
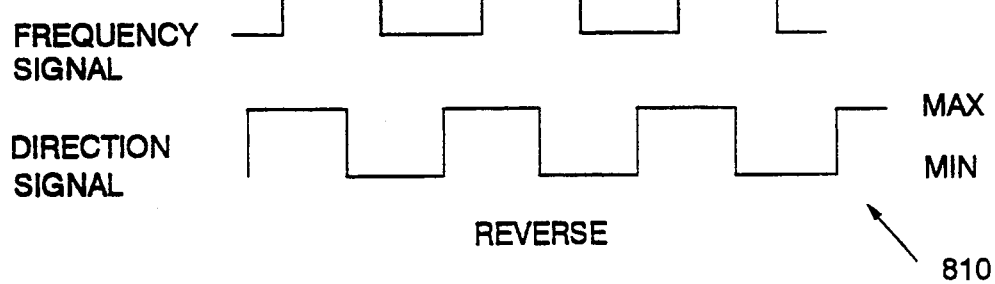
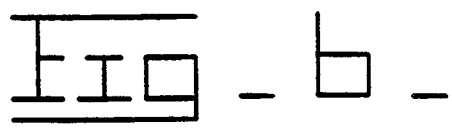
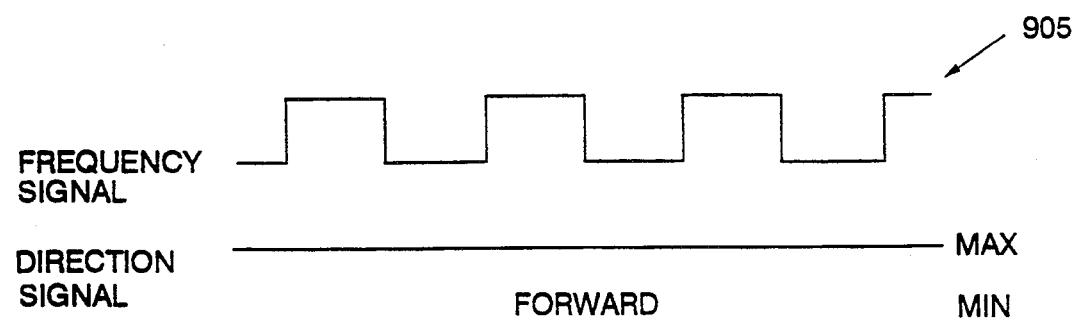
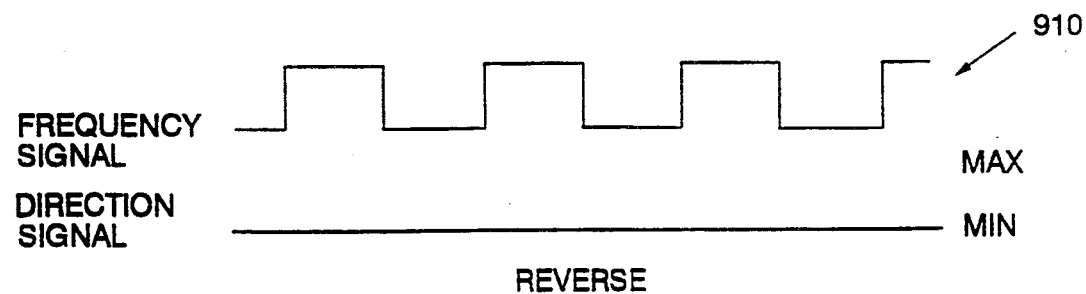

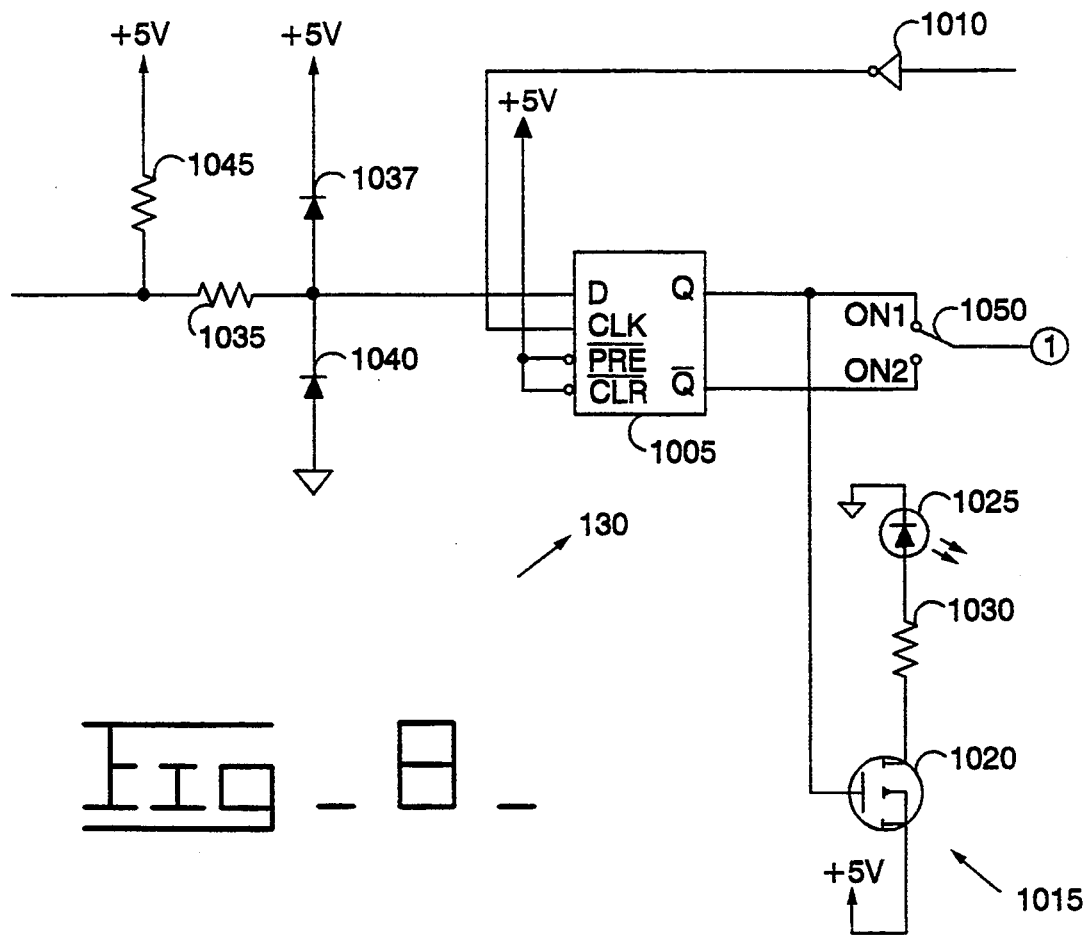
Fig_9_
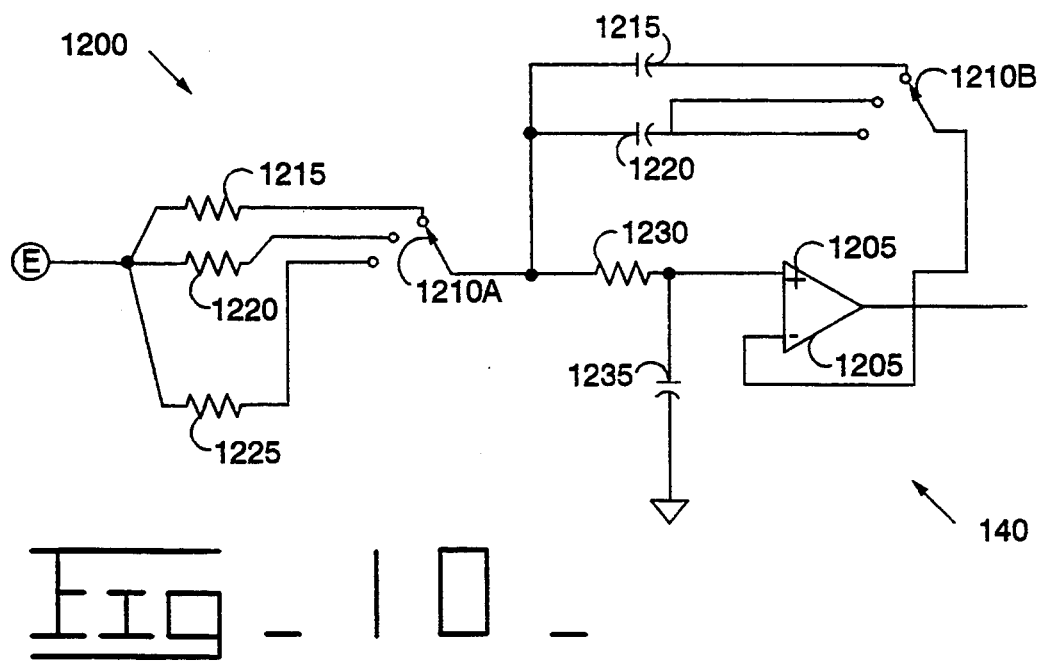
Fig_10_

APPARATUS INCLUDING A SELECTIVELY CONNECTABLE ISOLATION TRANSFORMER FOR DETERMINING THE SPEED AND DIRECTION OF A ROTATING OBJECT

TECHNICAL FIELD

This invention relates generally to an apparatus for detecting the speed and direction of a rotating object and, more particularly, to an apparatus for detecting the speed and direction of a rotating object in response to receiving either quadrature or logic signals.

BACKGROUND ART

Test engineers require a myriad of data to predict the reliability of a product. Engineers that test products of a mechanical design that have moving or rotating parts desire to know the speed and direction of the rotating parts. Accordingly, instruments have been built to provide the above function.

For example, typically a sensor is mounted adjacent the rotating part to sense its rotation. Responsively, the sensor produces a frequency and direction signal. The frequency signal represents the speed of rotation, while the direction signal represents the direction of rotation. The instrument is used to decode the frequency and direction signal to provide the test engineer with meaningful data.

The direction signal may take two forms—quadrature or logic. The form of the direction signal is dependent upon the type of sensor used, which is largely a function of the particular application. Unfortunately, many of these instruments are limited to encoding either a quadrature or logic signal, but not both. This limits the type of sensors that the test engineer may use, or requires him to purchase another instrument with which he must become familiar. Moreover, many of such instruments are designed to utilize a plurality of discrete electrical components that leads to complex, expensive circuitry.

The present invention is directed to overcoming one or more of the problems as set forth above.

DISCLOSURE OF THE INVENTION

In one aspect of the present invention, an apparatus determines the rotational speed and direction of a rotating object. The apparatus includes a sensor adapted to detect the speed and direction of the rotating object and responsively produce a frequency signal indicative of the speed of the rotating object and a direction signal having a voltage value indicative of the rotational direction of the rotating object. A distinguishing stage receives the frequency and direction signals, and determines the voltage value of the portion of the direction signal that coincides with the falling edge of the frequency signal. Responsively the distinguishing stage produces a control signal having a voltage level responsive to the determined voltage value of the direction signal. A converting stage receives the frequency signal and responsively produces an output signal having a DC voltage proportional to the frequency of the frequency signal. A directional stage receives the control signal and the output signal, and changes the polarity of the output signal in response to the voltage level of said control signal. An output device receives the polarized output signal, and responsively stores the magnitude and polarity of the output signal.

BRIEF DESCRIPTION OF THE DRAWINGS

For a better understanding of the present invention, reference may be made to the accompanying drawings in which:

FIG. 5 shows a circuit schematic of a scaling stage;

FIG. 6 shows a diagram of quadrature signals;

FIG. 7 shows a diagram of logic signals;

FIG. 8 shows a circuit schematic of a distinguishing stage;

FIG. 9 shows a circuit schematic of a directional stage; and

FIG. 10 shows a circuit schematic of a filtering stage.

BEST MODE FOR CARRYING OUT THE INVENTION

Figure 1:
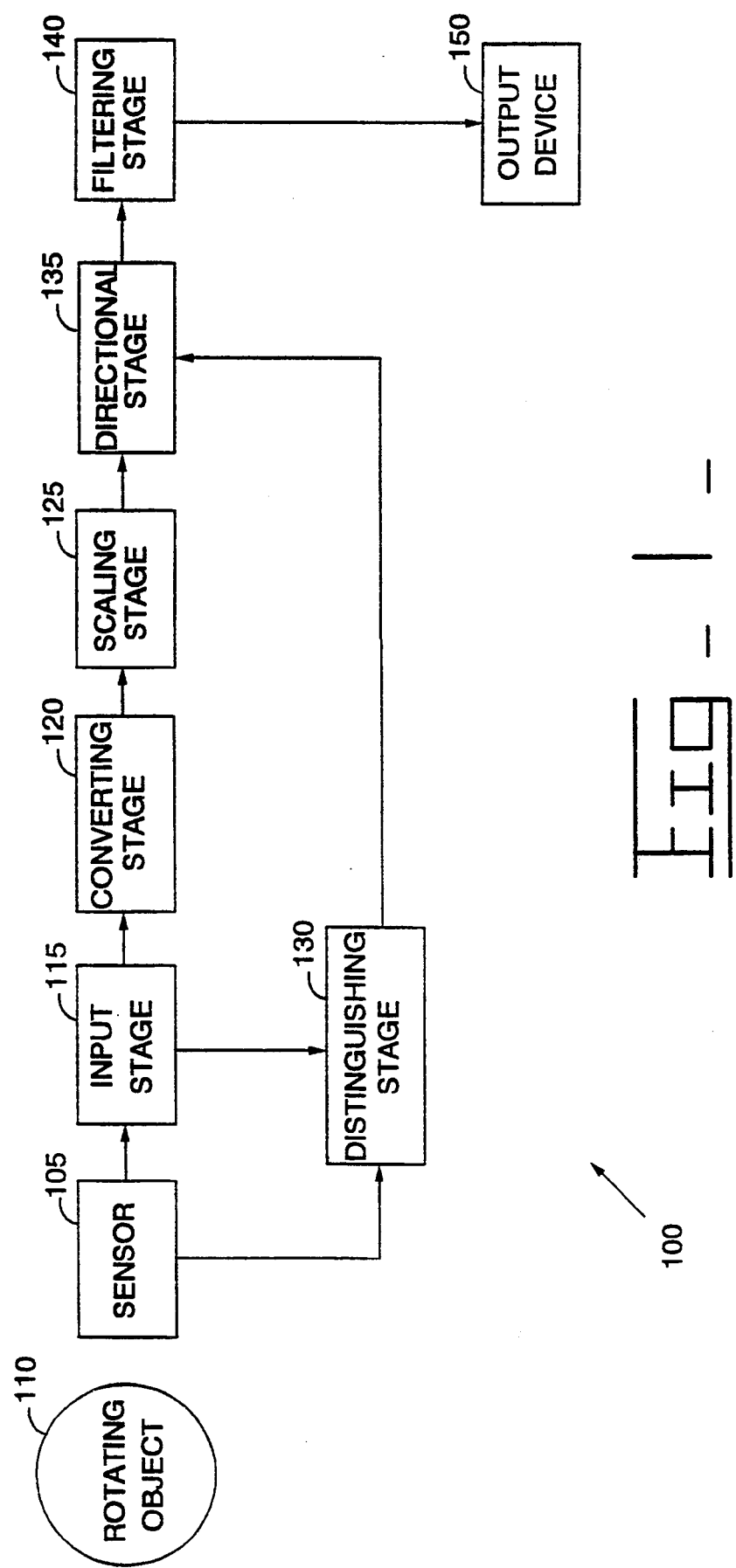
FIG. 1 shows a block diagram of the various stages associated with the present invention.

The present invention is directed toward an apparatus for determining the speed and direction of a rotating object. FIG. 1 shows a block diagram of the present invention, shown generally as 100. A sensor 105 measures the speed and direction of a rotating object 110. The particular type of sensor is not critical to the present invention, as long as, it produces either quadrature or logic signals. The rotating object 110 may include a set of clutch plates, for example, or any other device that alternately rotates in a clockwise or counter clockwise direction.

The sensor 105 delivers a frequency signal having a frequency proportional to the rotational speed of the rotating object 110 to an input stage 115. The input stage 115 conditions the frequency signal and delivers the conditioned frequency signal to a converting stage 120. The converting stage 120 produces an output signal having a magnitude proportional to the frequency of the frequency signal to a scaling stage 125. The scaling stage 125 selectively scales or amplifies the output signal in response to predetermined operator settings.

Further, the sensor 105 delivers a direction signal indicative of the rotational direction of the rotating object 110 to a distinguishing stage 130. The distinguishing stage 130 receives the frequency and direction signal, decodes the direction signal and responsively delivers a control signal to a directional stage 135. The directional stage 135 receives both the control signal and the output signal, and changes the polarity of the output signal in response to the logic level of the control signal. The output signal is finally delivered to a filtering stage 140 to remove any "ripple" or noise from the output signal. The filtered output signal can then be delivered to an output device 150 that can store the magnitude and polarity of the output signal for later analysis.

The circuitry of the various stages will now be discussed. Ordinarily the sensors 105 that produce the frequency and direction signals require no signal conditioning. However, in exceptional cases the frequency signal may need conditioning, thus circuitry similar to the input stage 115 may be desirable.

Figure 2:
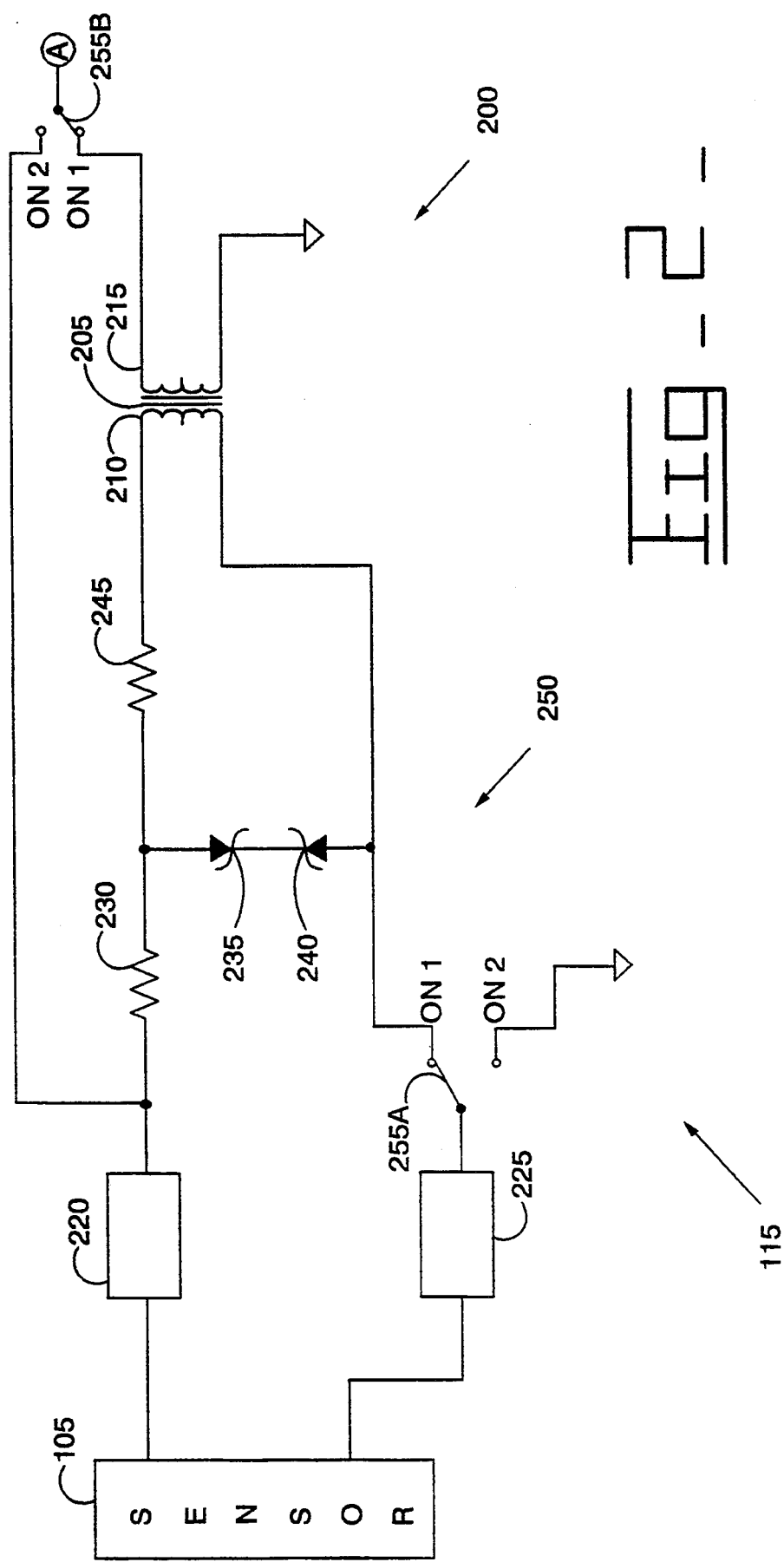
FIG. 2 shows a circuit schematic of a portion of an input stage.

The input stage 115 may include three sections, each section offering a distinct type of signal conditioning. The first section is an isolation section 200, shown in FIG. 2. The isolation section 200 is particularly useful when grounded sensors are utilized. For example, the isolation section 200 receives the frequency signal, and isolates the sensor ground from the circuit ground. Thus, undesirable "ground loops" between the sensor ground and the circuit ground are eliminated. The isolation section 200 includes a transformer 205 which has a primary 210 connectable to the grounded sensor and a secondary 215 connectable to the converting stage 120 and the circuit ground.

For example, the frequency signal travels through ferrite beads 220,225 to filter any high frequency components (noise) present on the frequency signal. Resistor 230 and the "back to back" configured Zener diodes 235,240 limit the amplitude of the frequency signal. Accordingly, the limited frequency signal is applied to the primary of the transformer, with resister 245 limiting the current through the transformer to avoid saturating the core. The frequency signal is "induced" across the transformer secondary, now referenced to the circuit ground, and delivered to the converting stage 120.

It is well known that transformers have a limited frequency range. Thus, some signals will be attenuated by the transformer. Advantageously, the input stage includes a double-pole, double-throw switch 250 to allow signals with a predetermined frequency range to "bypass" the transformer of the isolation section 200. For example, in one position (on1), one pole 255A connects the sensor ground to the transformer primary and the other pole 255B connects the converting stage 120 to the transformer secondary. In a second position (on2), the one pole 255A connects the sensor ground to the circuit ground and the other pole 255B connects the converting stage 120 directly to the sensor 105; thus, removing the transformer from the signal path.

Figure 3:
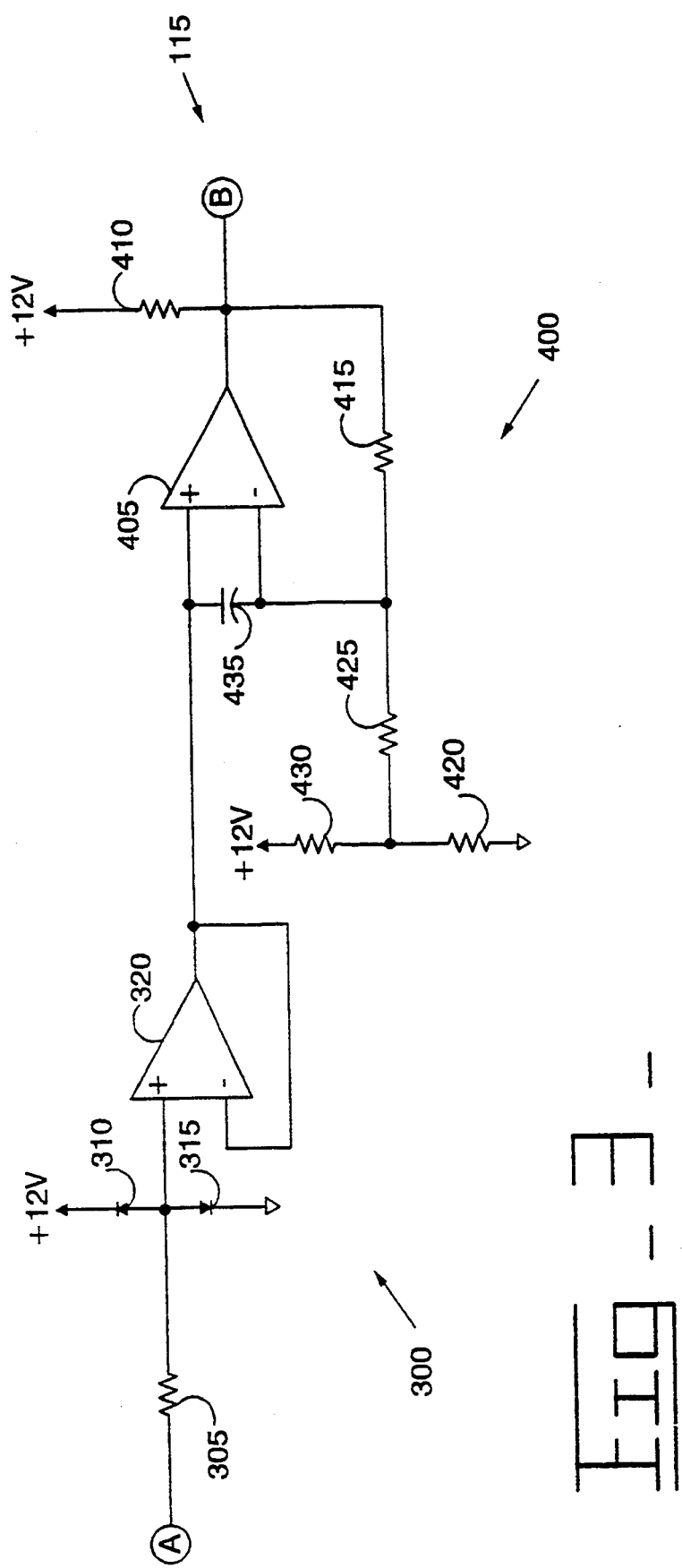
FIG. 3 shows a circuit schematic of another portion of the input stage.

The second section of the input stage is an amplitude limiting section 300, shown in FIG. 3. This section "clamps" the maximum amplitude of the frequency signal to the voltage value of the circuitry power supply. A high impedance resistor 305 and diodes 310,315 prevent the magnitude of the frequency signal from damaging the circuitry. The limited frequency signal is then buffered by amplifier 320 to isolate the high impedance resistor 305 from the other stages.

Once the amplitude of the frequency signal is limited, then a comparator section 400 "sharpens" the waveform of the frequency signal. One example of the comparator section 400 is shown in FIG. 3. A comparator 405 is configured as a positive voltage crossing detector. As is well known, a positive voltage crossing detector that transforms degraded portions of the frequency signal to a signal having "sharp" rising and falling edges. The positive voltage crossing detector includes resistors 410,415,420,425,430 and capacitor 435. A positive voltage crossing detector is well known in the art and its operation will not be discussed.

The final section of the input stage 115 includes a TTL level shifter. One example of a TTL level shifter is shown generally by 500 of FIG. 4. The TTL level shifter 500 "shifts" the sharpened frequency signal into TTL compatible signals. A n-channel MOSFET transistor 505 has a gate connected to the positive voltage crossing detector 405, a drain connected to the circuit power supply via resistor 510, and a source and substrate connected to circuit ground. As shown, resistor 510 and resistor 515 form a voltage divider. A diode 520 is utilized to prevent the TTL level shifter output to become negative. The operation of a TTL level shifter, such as the one illustrated, is well known and will not be discussed.

It should be noted that the input stage 115 is given by way of illustration. The present invention is not limited to the functionality of the various sections of the input stage, and one or all of the sections can be eliminated for proper operation of the present invention. Thus, the frequency signal can be delivered directly from the sensor 105 to the converting stage 120 and distinguishing stage 130.

Figure 4:
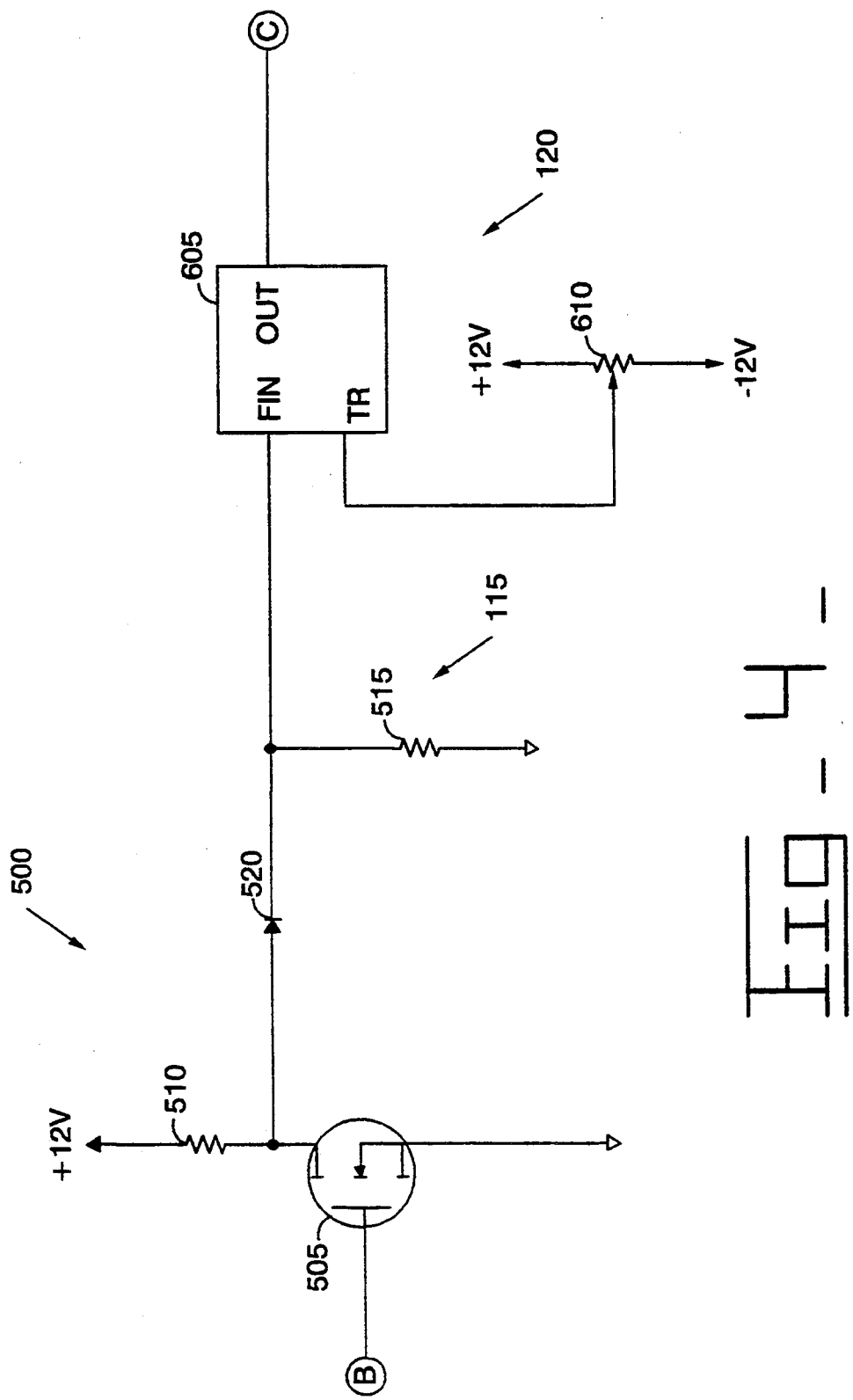
FIG. 4 shows a circuit schematic of a converting stage.

The converting stage 120 will now be discussed. One example circuit of the converting stage 120 is shown in FIG. 4. The converting stage 120 includes an F/DC integrated circuit 605 similar to that manufactured by Analog Devices as product no. 451K. The F/DC converter 605 produces a DC output voltage signal proportional to the frequency of the frequency signal (1 V/kHz). As shown, the F/DC convertor 605 receives the frequency signal at an input terminal FIN and delivers the output signal at an output terminal OUT. A potentiometer 610 is connected to a trim terminal TR to provide a manual offset voltage adjustment. Although a hybrid circuit is illustrated as one embodiment of the converting stage 120, it is recognized by artisans that other circuitry may be readily employed.

The magnitude of the output signal can be amplified by the scaling stage, as shown in FIG. 5. As shown an amplifier 705 is connected in a non-inverted feedback configuration. "Course" gain of the amplifier 705 is adjustable by changing the resistive value of the feedback loop through switch 710 and resistors 715,720,725. For example, the course gain is selectable to 3, 6, and 24. "Fine" gain of the amplifier 705 is made by adjusting the potentiometer 730 connected to the positive input of the amplifier 705. The fine gain is controllable between 0 and 1. A capacitor 735 is used to eliminate noise spikes.

The distinguishing stage 130 will now be discussed with reference to FIGS. 8 and 9. The distinguishing stage 130 receives the direction signal, determines the representative direction of rotation and responsively delivers a control signal to the directional stage 135. Advantageously, the distinguishing stage 130 can determine the representative direction of two types of signals—quadrature and logic signals.

The quadrature signals are shown in FIG. 6. Referring to 805, the frequency signal has a 50% duty factor, wherein each pulse is defined by a rising edge and a falling edge. The direction signal also has a 50% duty factor, but is phase shifted 90 degrees from the frequency signal. For example, as shown by 805, the frequency signal leads the direction signal by 90 degrees, which indicates a forward speed direction (Clockwise). As shown by 810, the frequency signal lags the direction signal by 90 degrees, which represents a reverse speed direction (Counter Clockwise). It is noted that the direction signal alternates between a maximum voltage value (5 volts) and a minimum voltage value (0 volts).

Referring to FIG. 7, logic signals are shown. The frequency signal remains unchanged; however, the direction signal has a continuous voltage value. For example, shown by 905, a "logical high" or maximum voltage value represents the forward speed direction. As shown by 910, a "logical low" or minimum voltage value represents a reverse speed direction.

Advantageously, the distinguishing stage 130 identifies the representative direction of the direction signal by determining the voltage value of a portion of the direction signal that coincides with the falling edge of the frequency signal. As shown by 805 and 905, the portion of the direction signal that coincides with the falling edge of the frequency signal has a maximum voltage value. Similarly, shown by 810 and 910, the portion of the direction signal that coincides with the falling edge of the frequency signal has a minimum voltage value. Thus, the representative direction of the direction signal can be determined irrespective to the direction signal being either a quadrature or logic signal.

The circuitry of the distinguishing stage 130 is shown in FIG. 8. A "rising edge triggered" D flip-flop 1005 having D and clock (CLK) input terminals, and Q and complementary Q output terminals is illustrated. The D flip-flop is similar to that manufactured by Motorola as product no. 74HC74. As shown, the preset (PRE) and clear (CLR) terminals are "tied high." The D flip-flop 1005 receives the direction signal at the D input terminal. Additionally, the D flip-flop 1005 receives an inverted frequency signal via inverter 1010 at the clock input terminal. Advantageously, the D flip-flop latches the Q output terminal to the voltage value of the direction signal in response to the rising edge transition of the inverted frequency signal. Responsively, the D flip-flop delivers a control signal having a voltage level responsive to the voltage value at the Q output terminal to the directional stage 135. Accordingly, a control signal having a "high" voltage level (5 volts) corresponds to the Q output terminal being at a maximum voltage value, and a control signal having a "low" voltage level (0 volts) corresponds to the Q output terminal being at a minimum voltage value.

The distinguishing stage 130 includes other features. A signaling stage 1015 is included to provide the operator with a visual indication of the direction signal. For example, the signaling stage 1015 receives the control signal and produces an optical signal in response to the control signal having a low logical level, representative of a reverse speed direction. The signaling stage 1015 includes a P-channel MOSFET transistor 1020 having a gate connected to the Q output terminal, a drain connected to an LED 1025 via resistor 1030, and a source and substrate connected to the circuit power supply. The signaling stage 1015 may be useful for diagnostic purposes.

The D flip-flop 1005 is protected against over and undervoltages by resistor 1035, diodes 1037,1040 and pull-up resistor 1045. Switch 1050 allows the operator to change the polarity of the control signal.

The directional stage 135 is shown at FIG. 9. As shown, the output signal is delivered to two parallel gain sections which multiply the output signal by a +1 gain and a −1 gain. For example, an inverting amplifier 1105 produces the negative gain. The inverting amplifier, 1105 is configured with resistors 1107,1108 of equal value. For good accuracy, high precision resistors should be used. Resistor 1109 is connected to the positive input of the inverting amplifier 1105. A non-inverting amplifier 1110 produces the positive gain. The non-inverting amplifier 1110 is configured as a non-inverting buffer. Preferably, both amplifier sections should have identical gains.

An analog switch 1115 receives the positive signal at terminal S1, the negative output signal at terminal S2 and the control signal at terminal A. The analog switch 1115 passes the positive output signal in response to the control signal having a "high" voltage level, and passes the negative output signal in response to the control signal having a "low" voltage level. The analog switch 1115 is similar to that provided by Analog Devices as part no. AD7512.

Finally, the last stage of the apparatus 100 is the filtering stage 140. Preferably the filtering stage includes a second order Butterworth filter with selectable frequency responses that is adapted to effectively remove any rippling without effecting the response of the output signal. Shown in FIG. 10 is an amplifier 1205 configured as a second order Butterworth filter 1200. As shown, the positive feedback stage and input stage includes a two pole switch 1210A,B. One pole 1210A selectively connects resistors 1215,1220,1225 to the non-inverting input of the amplifier 1205. The other pole 1210B selectively connects capacitors 1215,1220 to the non-inverting input of the amplifier 1205. For example, the filter is selectable to 25, 50, and 175 Hz. Resistor 1230 and capacitor 1235 are connected to the non-inverting input of the amplifier 1205.

INDUSTRIAL APPLICABILITY

An operational example of the present invention will now be discussed. The sensor 105 senses the rotation and direction of the rotating object 110, and responsively delivers the frequency signal to the converting state 120 and the distinguishing stage 130. The converting stage 120 produces the output signal having DC voltage proportional to the frequency of the frequency signal. The output signal may be amplified a predetermined amount in response to operator settings of the scaling stage 125. The amplified output signal is delivered to the directional stage 135.

Referring now to FIG. 8, the distinguishing stage 130 receives the direction and frequency signal. The inverter 1010 inverts the frequency signal (converts a falling edge of the frequency signal to a rising edge) and delivers the inverted frequency signal to the D flip-flop 1005. The D flip-flop latches the Q output terminal to the voltage value of the direction signal that coincides with the rising edge of the inverted frequency signal. Assuming the direction signal to be representative of a reverse speed direction (the switch 1050 being set to the on1 position), the D flip-flop 1005 delivers a control signal having a "low" voltage level to the directional stage 135.

Referring now to FIG. 9, the inverting amplifier 1105 changes the polarity of the output signal and delivers the negative output signal to the analog switch 1115. The analog switch 1115 passes the negative output signal in response to receiving the "low" voltage level of the control signal. The negative output signal is delivered to the filtering stage 140.

Responsively, the filtering stage 140 filters a predetermined frequency range from the output signal to remove any undesirable "rippling" that may be imposed on the output signal. The filtered output signal is finally delivered to the output device 150, which can store the representative values for subsequent analysis. For example, the magnitude of the output signal is determinative of the rotational speed of the rotating object. While, the polarity of the output signal is determinative of the rotational direction of the rotating object. The output device 150 can store the values on magnetic tape or digitize the values for analysis on a computer. Additionally, the output device may display the values "real-time" using a strip chart recorder, a cathode ray tube or the like. Output devices are well known in the art and the particular type of output device is not critical to the present invention.

Other aspects, objects and advantages of the present invention can be obtained from a study of the drawings, the disclosure and the appended claims.

We claim:

1. An apparatus for determining the rotational speed and direction of a rotating object, wherein the apparatus has a circuit ground and power, the apparatus further comprising:
    a sensor having a sensor ground and being adapted to detect the speed and direction of the rotating object and responsively produce an input frequency signal having a frequency proportional to the rotational speed of the rotating object and a direction signal having a voltage value indicative of the rotational direction of the rotating object;
    a common terminal;
    a transformer adapted to receive the input frequency signal and electrically isolate the sensor ground from the circuit ground;
    double-pole, double-throw switch means coupling the input frequency signal through said transformer to said common terminal in a first position of said switch means, and, bypassing said transformer, connecting said sensor ground to circuit ground, and coupling said input frequency signal directly to said common terminal in a second position of said switch means;
    means for receiving said input frequency signal from said common terminal, and responsively producing a conditioned frequency signal having a pulsed waveform wherein each pulse is defined by a rising edge and a falling edge;
    distinguishing means for receiving said conditioned frequency and direction signals, determining the voltage value of a portion of said direction signal that coincides with the falling edge of said conditioned frequency signal, and responsively producing a control signal having a voltage level responsive to the determined voltage value of said direction signal;
    converting means for receiving said conditioned frequency signal and responsively producing an output signal having a DC voltage proportional to the frequency of said conditioned frequency signal;
    directional means for receiving the control signal and the output signal, and changing the polarity of the output signal in response to the voltage level of said control signal; and
    an output device adapted to receive the polarized output signal, and responsively store the magnitude and polarity of the output signal for subsequent analysis.

2. An apparatus, as set forth in claim 1, wherein said direction signal has a 50% duty factor and is phase shifted 90 degrees with respect to said frequency signal.

3. An apparatus, as set forth in claim 2, wherein said distinguishing means includes:
    an inverter adapted to receive said conditioned signal and responsively invert said conditioned signal; and
    a D flip-flop having a clock and D input terminals and a Q output terminal, the D flip-flop being adapted to receive said direction signal at the D input terminal and the inverted frequency signal at the clock input terminal, to latch the Q output terminal at the voltage value of said direction signal in response to the rising edge transition of the inverted frequency signal, and to produce said control signal having a voltage level responsive to the voltage value at the Q output terminal.

4. An apparatus, as set forth in claim 3, wherein the directional means includes:
    an inverting amplifier adapted to multiply the output signal by a negative gain and produce a negative output signal;
    a non-inverting amplifier adapted to multiply the output signal by a positive gain and produce a positive output signal; and
    an analog switch adapted to receive the positive and negative output signal and the control signal, pass the positive output signal in response to the control signal having a "high" voltage level, and pass the negative output signal in response to the control signal having a "low" voltage level.

5. An apparatus, as set forth in claim 4, including a scaling means for receiving said output signal and selectively amplifying said output signal.

6. An apparatus, as set forth in claim 5, including a filter adapted to receive the polarized output signal and responsively remove predetermined frequency components from the output signal.

7. An apparatus, as set forth in claim 6, wherein said filter includes a second order Butterworth filter.

8. An apparatus, as set forth in claim 7, including a signaling means for receiving the control signal and producing an optical signal in response to the control signal having a "low" voltage level.

9. An apparatus, as set forth in claim 8, wherein said signaling means includes:
    an LED connected between the Q output terminal and the circuit ground; and
    a P-channel MOSFET transistor having a gate connected to the Q output terminal, a drain connected to the LED, and a source and substrate connected to the circuit power.

* * * * *